(12) United States Patent
Kanada et al.

(10) Patent No.: US 8,190,709 B2
(45) Date of Patent: May 29, 2012

(54) CONTENT DATA PROVIDING SERVER, CONTENT DATA PROVIDING SYSTEM AND METHOD, AND TERMINAL UNIT

(75) Inventors: Yoriaki Kanada, Kanagawa (JP); Takumi Kanasashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1032 days.

(21) Appl. No.: 10/448,360

(22) Filed: May 30, 2003

(65) Prior Publication Data

US 2004/0006607 A1 Jan. 8, 2004

(30) Foreign Application Priority Data

May 31, 2002 (JP) ................................. 2002-159037

(51) Int. Cl.
*G06F 15/16* (2006.01)
(52) U.S. Cl. ....................................... 709/219; 709/229
(58) Field of Classification Search .................. 709/219, 709/229
See application file for complete search history.

(56) References Cited

U.S. PATENT DOCUMENTS

| | | | | |
|---|---|---|---|---|
| 5,809,003 A * | 9/1998 | Taira et al. | ................. | 369/275.1 |
| 5,828,820 A * | 10/1998 | Onishi et al. | ................. | 714/6.32 |
| 5,832,088 A * | 11/1998 | Nakajima et al. | ............... | 380/22 |
| 5,881,038 A * | 3/1999 | Oshima et al. | ............. | 369/47.12 |
| 5,972,159 A * | 10/1999 | Uryu et al. | .................... | 156/344 |
| 6,019,863 A * | 2/2000 | Irie et al. | ........................ | 156/182 |
| 6,097,814 A * | 8/2000 | Mochizuki | ....................... | 380/44 |
| 6,529,949 B1 * | 3/2003 | Getsin et al. | .................. | 709/217 |
| 6,622,158 B1 * | 9/2003 | Koyata et al. | ................. | 709/203 |
| 6,782,190 B1 * | 8/2004 | Morito | ............................ | 386/94 |
| 6,983,314 B1 * | 1/2006 | Yoneda | .......................... | 709/219 |
| 6,993,567 B1 * | 1/2006 | Yodo et al. | ..................... | 709/217 |
| 7,020,704 B1 * | 3/2006 | Lipscomb et al. | ............. | 709/226 |
| 7,116,615 B2 * | 10/2006 | Yen | .............................. | 369/47.35 |
| 7,206,792 B2 * | 4/2007 | Kudo et al. | ................. | 707/104.1 |
| 7,239,601 B2 * | 7/2007 | Sato et al. | ................... | 369/275.3 |
| 2002/0055970 A1 * | 5/2002 | Noro | .............................. | 709/203 |
| 2002/0091575 A1 * | 7/2002 | Collart | ............................ | 705/22 |
| 2002/0116206 A1 * | 8/2002 | Chatani | ............................. | 705/1 |
| 2003/0200216 A1 * | 10/2003 | Hayes et al. | ....................... | 707/9 |
| 2003/0212790 A1 * | 11/2003 | Thambidurai et al. | ........ | 709/225 |
| 2003/0212819 A1 * | 11/2003 | Russell et al. | ................. | 709/238 |
| 2005/0080877 A1 * | 4/2005 | Sako et al. | ...................... | 709/219 |
| 2006/0069752 A1 * | 3/2006 | Chatani | .......................... | 709/219 |

FOREIGN PATENT DOCUMENTS

| | | |
|---|---|---|
| JP | 2001-134669 | 5/2001 |
| JP | 2002-063300 | 2/2002 |
| JP | 2002-109104 | 4/2002 |

\* cited by examiner

*Primary Examiner* — Brian P Whipple
(74) *Attorney, Agent, or Firm* — Oblon, Spivak, McClelland, Maier & Neustadt, L.L.P.

(57) ABSTRACT

A server includes a memory that stores unique identification information of an optical disc that stores at least one content data. The server also includes a receiver that receives user account information and the unique identification information from a user terminal. A processor performs an authentication of the user terminal for a transfer of the at least one content data based on a reception by the server of the unique identification information and the user account information from the user terminal. Further, the processor associates the user account information with the unique identification information upon a determination that the unique identification information has not previously been registered by the server based on the reception of the user account information and the unique identification information. A transmitter sends an authentication result to authorize the transfer of the at least one content data, in response to the authentication of the user terminal.

27 Claims, 10 Drawing Sheets

Fig. 7

| USER NAME WHO HAS BOUGHT CD | MEMBER NUMBER | CD IDENTIFICATION INFORMATION | SINGLE OR ALBUM | SINGER NAME | TITLE - DISC TITLE | TITLE - SONG NAME | UNIT IDENTIFICATION INFORMATION (CELLULAR PHONE NUMBER) |
|---|---|---|---|---|---|---|---|
| ICHIRO SUZUKI | 9012 | 1234567 | ALBUM | ICHIRO SATO | SPRING AND SUMMER | FIRST WIND IN SPRING | 09045789954 |
| | | | | | | FIRST WIND IN SUMMER | |
| | | 1234568 | ALBUM | JIRO SATO | AUTUMN AND WINTER | FIRST WIND IN AUTUMN | |
| | | | | | | FIRST WIND IN WINTER | |
| | | 1234569 | SINGLE | SABURO SATO | GOOD BY | | |
| | | 1234570 | SINGLE | ICHIRO KATO | MY SWEET | | |
| | | 3456789 | SINGLE | ICHIRO TANAKA | | | |
| | | 3456790 | SINGLE | ICHIRO NAKATA | | | |
| | | 3899256 | SINGLE | ICHIRO KONDO | | | |
| | | 4578123 | SINGLE | ICHIRO SUZUKI | | | |
| TARO YAMANAKA | 9013 | 0012345 | | JIRO SUZUKI | | | 09011145789 USER PDA TERMINAL ID 12345 |
| ICHIRO YAMAKAWA | 9014 | 0018956 | | ICHIRO SAKURAI | | | 09012345567 |

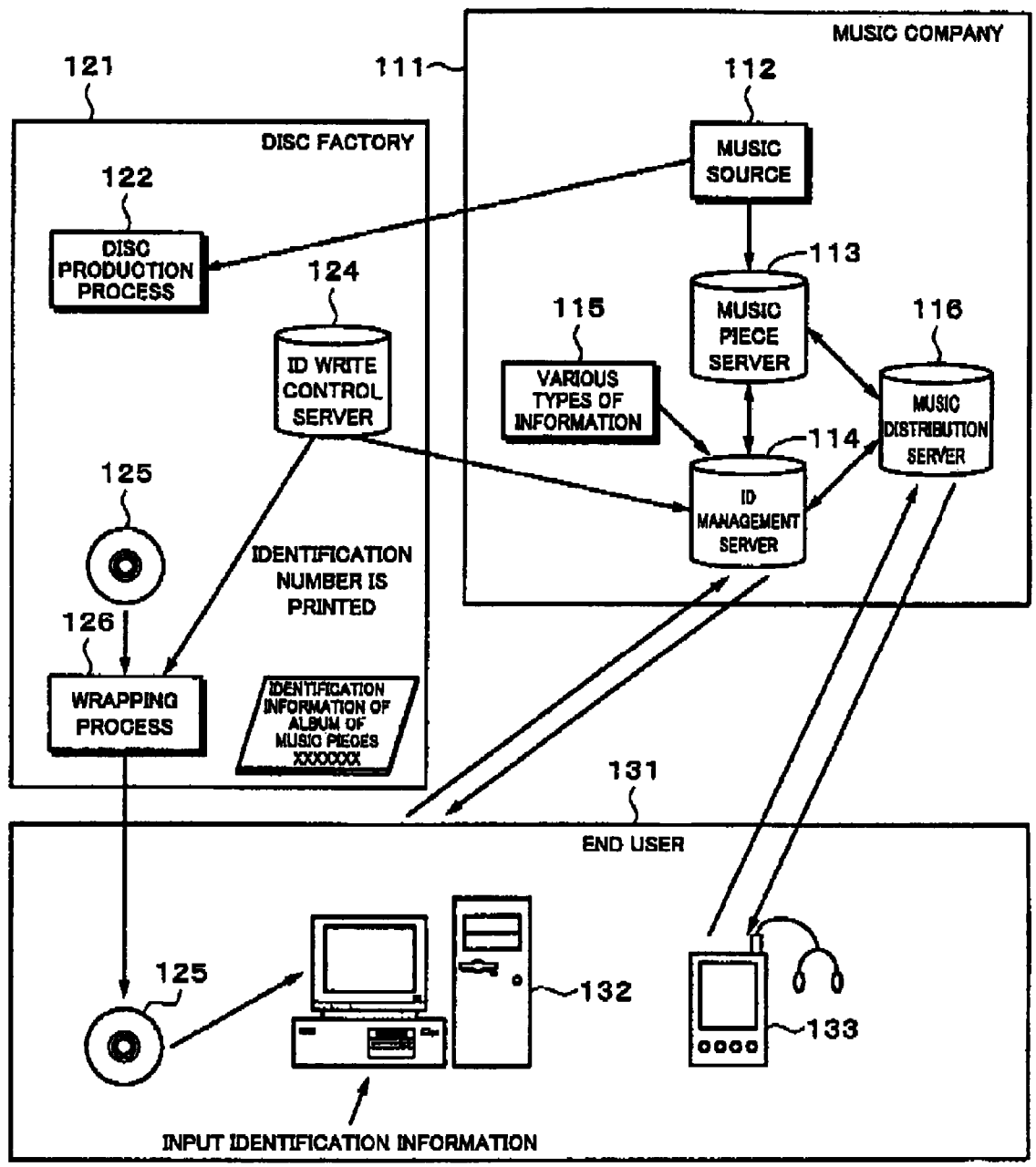

CONTENT DATA PROVIDING SERVER, CONTENT DATA PROVIDING SYSTEM AND METHOD, AND TERMINAL UNIT

BACKGROUND OF THE INVENTION

1. Field of the Invention

The present invention relates to a content data providing system, a content data providing method, and a terminal unit, in particular, to those that use unique identification information post-scribed on a CD (Compact Disc) disc on which for example music data to recorded.

2. Description of the Related Art

As a portable digital audio reproducing unit has become common, an environment of which each user can enjoy reproducing his or her favorite music anytime and anywhere has been almost accomplished. In addition, as music distribution systems using the Internet and cellular phones have come out, each user can easily buy music data. On the other hand, as such music distribution systems using the Internet and cellular phones have come out, it is apprehensive that copyright of music data will be infringed and sales of CDs will be decreased.

In other words, a portable digital audio reproducing unit that comprises a semiconductor memory that stores music data compressed according to MP3 (MPEG Audio Layer-3). ATRAC (Adaptive TRansform Acoustic Coding) 3, or the like and a decoder that reproduces music data from the semiconductor memory has become common. With such an apparatus, the user can enjoy reproducing music on every occasion for example in a vehicle, during a walk, or on a trip. Such a portable digital audio reproducing unit is called silicon audio. Since such an apparatus has advantages of small size, light weight, low power consumption, shock resistance, and easy operation because it does not use a disc.

In addition, a portable palm top computer called PDA (Personal Digital Assistance) has been used as a portable digital audio reproducing unit. Moreover, a music distribution service using cellular phones has started.

In the music distribution service using cellular phones, user's favorite music data is downloaded through a line for cellular phones and stored in a semiconductor memory of user's cellular phone. With the music distribution service using cellular phones, each user can enjoy reproducing his or her favorite music anytime and anywhere an with a portable digital audio reproducing unit.

When the user stores music data in the portable digital audio reproducing unit, he or she have to cause a personal computer to capture music data reproduced from the CD and compress the reproduced music data according to MP3 or the like. Thereafter, the user has to store a file of the compressed music data to a memory of the digital audio reproducing unit. That method has a benefit of which the user can effectively use the resource of the CD that he or she owns and store his or her favorite music to the portable digital audio reproducing unit.

However, in the method for storing music data reproduced from a CD to a portable digital audio reproducing unit, it is clear that music data that is recorded on the CD is copied. Thus, it is apprehensive that copyright of music cannot be protected.

Thus, although the portable digital audio reproducing unit is convenient because the user can reproduce music anytime and anywhere therewith, it is apprehensive that a problem about copyright of the source of music data will arise. Ideally, it is desired to protect music data of a CD from being copied. However, in the case, the user who has bought the CD will suffer a disadvantage.

Now, it is assumed that one user has bought his or her favorite CD album with payment and that he or she wants to enjoy music pieces of the CD album with a portable digital audio reproducing unit.

In that case, even if the user has bought the CD album, unless he or she can copy music data of the CD album to the portable digital audio reproducing unit, he or she cannot enjoy reproducing the music data with the portable digital audio reproducing unit.

When the same music data as music pieces of a CD album is provided as a music distribution service, the user can download the music data from the music distribution service, store the downloaded music data to the portable digital audio reproducing unit, and enjoy reproducing the music data with the portable digital audio reproducing unit. However, at the prevent time, with a fear that the sales of CDs will decrease, many music distribution services do not provide music pieces of latest albums.

In other words, as long as the user can use a network environment, since he or she can buy his or her favorite music data anytime and anywhere with the music distribution service, it is no doubt to may that the music distribution service provides him and her with high convenience. However, when the music distribution service provides the user with music data of latest albums, it is expected that he or she will buy it with the music distribution service, copy the music data, and enjoy reproducing it. AS a result, it Is apprehensive that the sales of the CDs will decrease. Thus, at the present time, latest albums that are expected to be sold a lot are normally sold as CDs, not provided with the music distribution service.

Even if the user can buy music data of his or her favorite album with the music distribution service, he or she should buy the same music data as that of the CD album, which he or she has bought, once again with the music distribution service. That means that the user has bought the same music data with double payment. Thus, the user will suffer at large loss.

Thus, when music data is completely protected from being copied, even if the user has bought a CD that he or she wants to listen without an intention to infringe copyright thereof, he or she cannot enjoy reproducing the music pieces with the portable digital audio reproducing unit. Alternatively, the user should buy the same music data twice as a disadvantage.

In addition, as was described above, at the present time, the music distribution service does not provide popular music such as latest albums with a fear of the decrease of sales of CDs. Although it is clear that the music distribution service is very convenient, unless it provides popular music such as latest albums, the music distribution service will not grow. That fact becomes one factor that prevents the music distribution service from growing.

From the forgoing point of view, it is desired to provide the user who has bought a CD with an environment that does not cause him or her to buy the same content data twice and that allows him or her to enjoy reproducing the content data, which he or she has bought, anytime and anywhere and the copyright owner with an environment that occasions of copies of CDs will decrease so as to prevent copyright from being infringed and that music data that the music distribution service provides does not affect the sales of CDs. As a result, it is desired to promote a sound growth of the music distribution service.

OBJECTS AND SUMMARY OF THE INVENTION

Therefore, an object of the present invention is to provide a content data providing system, a content data providing method, and a terminal unit that do not cause the user who has bought content data with a recording medium such as a CD to suffer from a disadvantage and allow him or her to reproduce the content data, which he or she has bought, anytime and anywhere.

Another object of the present invention is to provide a content data providing system, content data providing method, and a terminal unit that allow the copyright owner to have an environment of which occasion of copies of CDs will decrease so as to prevent copyright from being infringed and music data that the music distribution service provides does not affect the sales of CDs and that allow the music distribution service to soundly grow.

To solve the forgoing problem, a first aspect of the present invention is a content data providing server connected to a terminal unit of a user and a terminal unit of a recording medium producer through a network, the content data server having: a management server for receiving unique identification information of a recording medium, the unique identification information being post-scribed by the producer, unique identification information of a recording medium that the user has bought, personal information of the user, and identification information of the terminal unit of the user, creating a list that represents the relation between those information and identification information of content data of the recording medium that the user owns, and storing the list; a content server for storing content data corresponding to the identification information of the content data, the identification information being contained in the list; and a content distribution server for distributing content data stored in the content server to the terminal unit of the user corresponding to a distribution request that the terminal unit of the user has issued, wherein when the user who has issued the distribution request and the unique identification information of the recording medium corresponding to the distribution request are contained in the list, the content data corresponding to the unique identification information is permitted to be distributed.

A second aspect of the present invention is a content data providing system connected to a content providing server, a terminal unit of a recording medium producer, and a terminal unit of a user through a network, wherein the terminal unit of the user is configured to register personal information of the user to the content providing server and transmit unique identification information of a recording medium that the user has bought, wherein the content providing server has: a management server for receiving unique recording medium identification information of a recording medium, the unique identification information being post-scribed by the recoding medium producer, the unique identification information of the recording medium that the user has bought, the personal information of the user, and identification information of the terminal unit of the user, creating a list that represents the relation between those information and identification information of content data of the recording medium that the user owns, and storing the list; a content server for storing content data corresponding to the identification information of the content data, the identification information being contained in the list; and a content distribution server for distributing content data stored in the content server to the terminal unit of the user corresponding to a distribution request that the terminal unit of the user has issued, wherein when the user who has issued the distribution request and the unique identification information of the recording medium corresponding to the distribution request are contained in the list, the content data corresponding to the unique identification information is permitted to be distributed.

A third aspect of the present invention is a content data providing method for a system connected to a content providing server, a terminal unit of a recording medium producer, and a terminal unit of a user through a network, the content providing method having the steps of: causing the terminal unit of the user to register the user to the content providing server and transmit unique identification information of a recording medium that the user has bought; causing the terminal unit of the user to register personal information of the user to the content providing server and transmit the unique identification information of the recording medium that the user has bought to the content providing server; causing the content providing server to receive unique identification information of a recording medium, the unique identification information being post-scribed by the recoding medium producer, the unique identification information of the recording medium that the user has bought, the personal information of the user, and identification information of the terminal unit of the user, create a list that represents the relation between those information and identification information of content data of the recording medium that the user owns, and store the list; and permitting the content providing server to distribute the content data corresponding to the unique identification information when the user who has issued the distribution request and the unique identification information of the recording medium corresponding to the distribution request are contained in the list.

A fourth aspect of the present invention is a terminal unit for requesting a content providing server to distribute content data, the content providing server being configured to receive unique identification information of a recording medium, the unique identification information being post-scribed by the recoding medium producer, unique identification information of a recording medium that the user has bought, personal information of the user, and identification information of the terminal unit, create a list that represents the relation between those information and identification information of content data of the recording medium that the user owns, and store the list, the terminal unit comprising: means for transmitting the identification information of the terminal unit to the content providing server so as to request it to distribute the content data; means for receiving the list corresponding to the identification information of the terminal unit or a part thereof from the content providing server and displaying the list when the user who has issued the distribution request and the unique Identification information of the recording medium corresponding to the distribution request are contained in the list; and means for selecting a content that the user wants the content providing server to distribute from the list or a part thereof, receiving the selected content data from the content providing server, and reproducing or storing the received content data.

When content data (music data) is recorded on each recording medium such as a CD disc, unique disc identification information (UDI) is post-scribed to the recording medium. A management server (ID management server), a content server (music piece server), and a content distribution server (music distribution server) are disposed. The management server (ID management server) manages content data recorded on the recording medium corresponding to the unique disc identification information post-scribed on the recording medium. The content server (music piece server) stores content data recorded on the recording medium. The content distribution server (music distribution server) reads content data from the content server corresponding to a distribution request issued from a terminal unit (portable digital audio reproducing unit)

and distributes the content data to the terminal unit (portable digital audio reproducing unit) that has issued the distribution request.

When the end user has bought a recording medium, he or she performs a registration process for the recording medium with a user terminal (personal computer) through a network. In addition, the end user sends identification information to a management server of a content provider. With the identification information, a list that represents music pieces that each user owns is created. Corresponding to the list, music pieces that each user owns can be permitted to be reproduced or downloaded free of charge or at low price.

When the end user has bought a CD and registered as the user, he or she is provided with a music distribution service with priority. Thus, when the end user uses the portable digital audio reproducing unit, he or she does not need to copy the music data from the CD disc. In addition, the end user does not need to buy the same music data as the CD disc that he or she has bought.

In addition, the content provider side can expect that opportunities that users who have bought CDs will copy music data of the CDs will decrease. Thus, according to the present invention, copyright of music data can be easily protected. In addition, without necessity to copy music data from a CD disc to a portable digital audio reproducing unit, since the end user can obtain the music data through the music distribution service, it can be predicted that the sales of CDs are not affected (not decreased).

In addition, since sales of CDs are linked with a music distribution service, it can be predicted that contents providers will actively provide their music pieces through the music distribution service. Thus, it can be expected that the music distribution service will grow.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a schematic diagram showing a data structure of an example of a customer and owning music piece list;

FIG. 11 is a block diagram showing another example of a system according to the present invention.

DETAILED DESCRIPTION OF THE PREFERRED EMBODIMENTS

Figure 1:
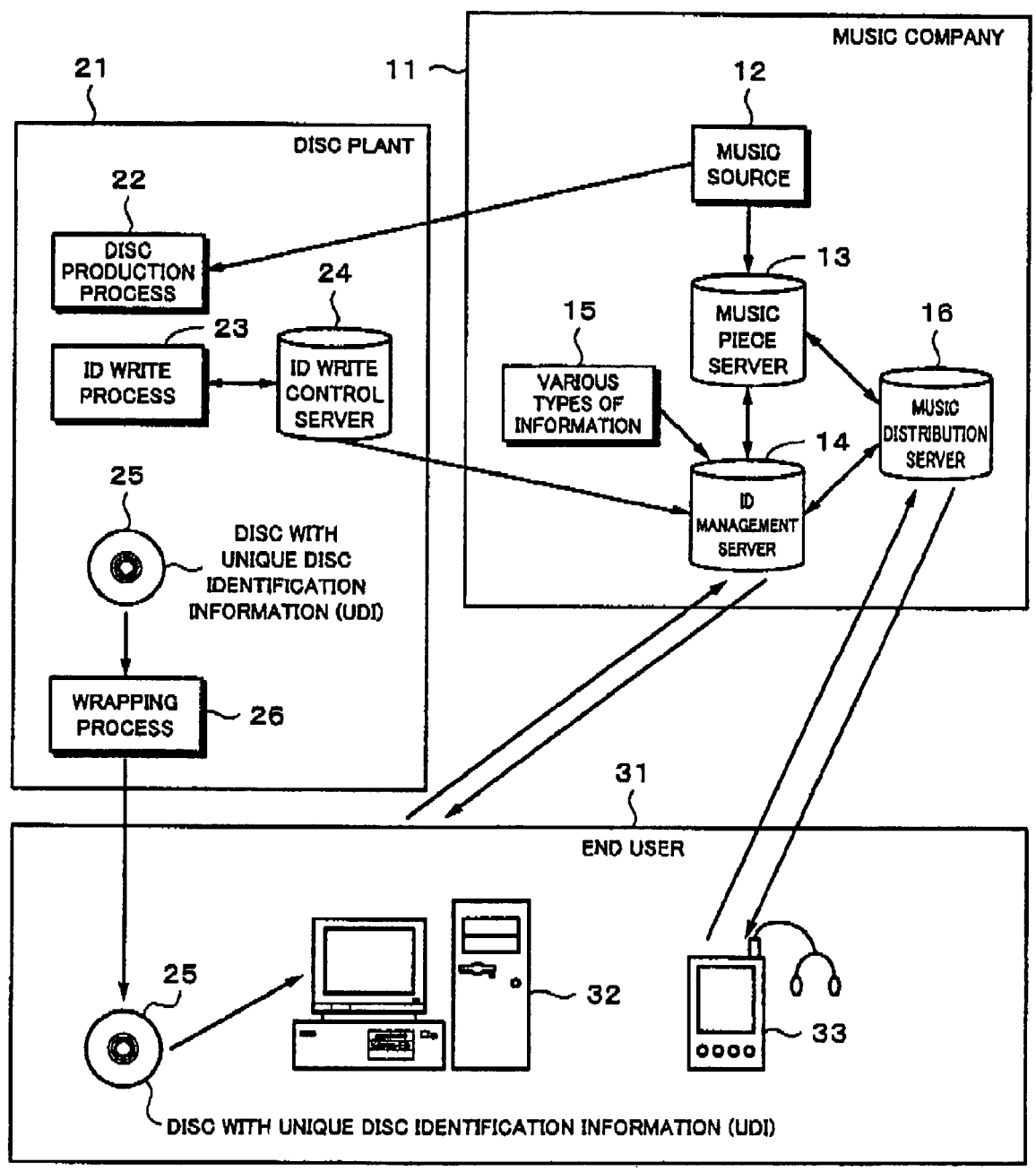
FIG. 1 is a block diagram showing an example of a system according to the present invention.

Next, with reference to the accompanying drawings, an embodiment of the present invention will be described. FIG. 1 shows an example of a system according to the present invention. In the system, a music company 11 requests a disc plant 21 to produce a disc on which music data is recorded. The disc plant 21 produces a disc 25. The disc plant 21 sells the disc 25 to an end user 31. When the end user 31 who has bought the disc 25 registers as a user of the disc 25, the end user can receive a music distribution service for the music pieces as the owner thereof from a music distribution server with priority.

In the example, the disc 25 is a CD disc used as a recording medium. In the example, on each disc, unique disc identification information (UDI) can be post-scribed. The unique disc identification information (UDI) is information with which each disc is identified. The unique disc identification information (UDI) contains for example a disc producer name, a disc seller name, a production plant name, a production year, a serial number, and time information. In addition, the unique disc identification information (UDI) contains various types of information. The unique disc identification information (UDI) is recorded so that it can be read by a conventional CD player or a conventional CD-ROM drive.

With the disc 25 on which the unique disc is identification information (UDI) has been post-scribed, the music company 11 can know CDs that each user owns. Thus, the music company 11 can provide the end user 31 who has bought a CD with the music distribution service with priority. Before the description of the system shown in FIG. 1, a disc on which unique disc identification information (UDI) can be post-scribed will be described.

First of all, for easy understanding, the structure of a conventional optical disc for example a CD will be described.

Figure 2:
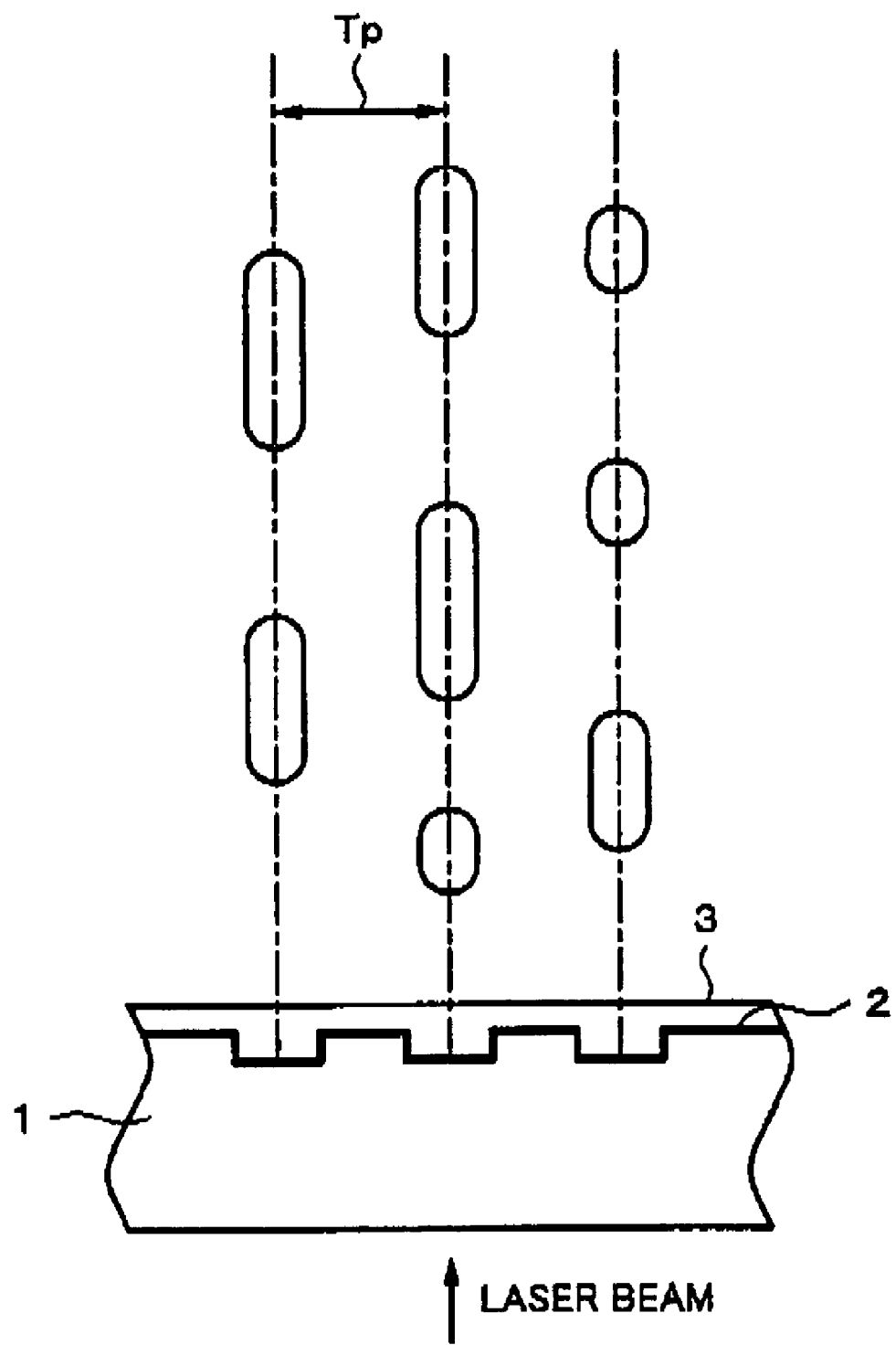
FIG. 2 is a sectional view for describing disc identification information that is recorded.

FIG. 2 is an enlarged view of a part of a conventional CD. Concave portions called pits and lands on which pits are not formed are alternately formed on each track whose track pitch is Tp (for example. 1.6 µm). The length of each of one pit and one land is in the range from 3T to 11T, where T is the shortest inversion period. A laser beam is radiated from a disc substrate side of the CD.

When the CD is viewed from the bottom side to which the laser beam to radiated, a transparent disc substrate 1, a reflection film 2, and a protection film 3 are successively disposed. The transparent disc substrate 1 has a thickness of 1.2 mm. The reflection film 2 is formed on the transparent disc substrate 1. The protection film 3 is formed on the reflection film 2. The reflection film 2 is made of a material that has a high reflectance. Although the CD is a read only disc, as will be described later, after the reflection film 2 in formed, unique disc identification information (UDI) is post-scribed on the reflection film 2 with the laser beam.

Next, with reference to FIG. 3, the flow of a CD production process will be described. At step S1, a glass substrate on which a photoresist as a photosensitive substance has been coated on a glass plate is rotated by a spindle motor. The laser beam that is turned on or off corresponding to a record signal is radiated on the photoresist film. As a result, a master is produced. The photoresist film is developed. When the photoresist film is a positive resist film, the exposed portion is etched and an etched pattern is formed on the photoresist film.

The photoresist substrate is plated. As a result, one metal master is produced (at step S2). With one metal master, a plurality of mothers are produced (at step S3). In addition, with one mother, a plurality of stampers are produced (at step S4). With one stamper, disc substrates are produced by for example a compression molding method, an injection molding method, or a light setting method. At step S6, the reflection film and the protection film are coated. In the conventional disc producing method, a label is printed on the CD. As a result, the CD is produced as a final product.

Figure 3:
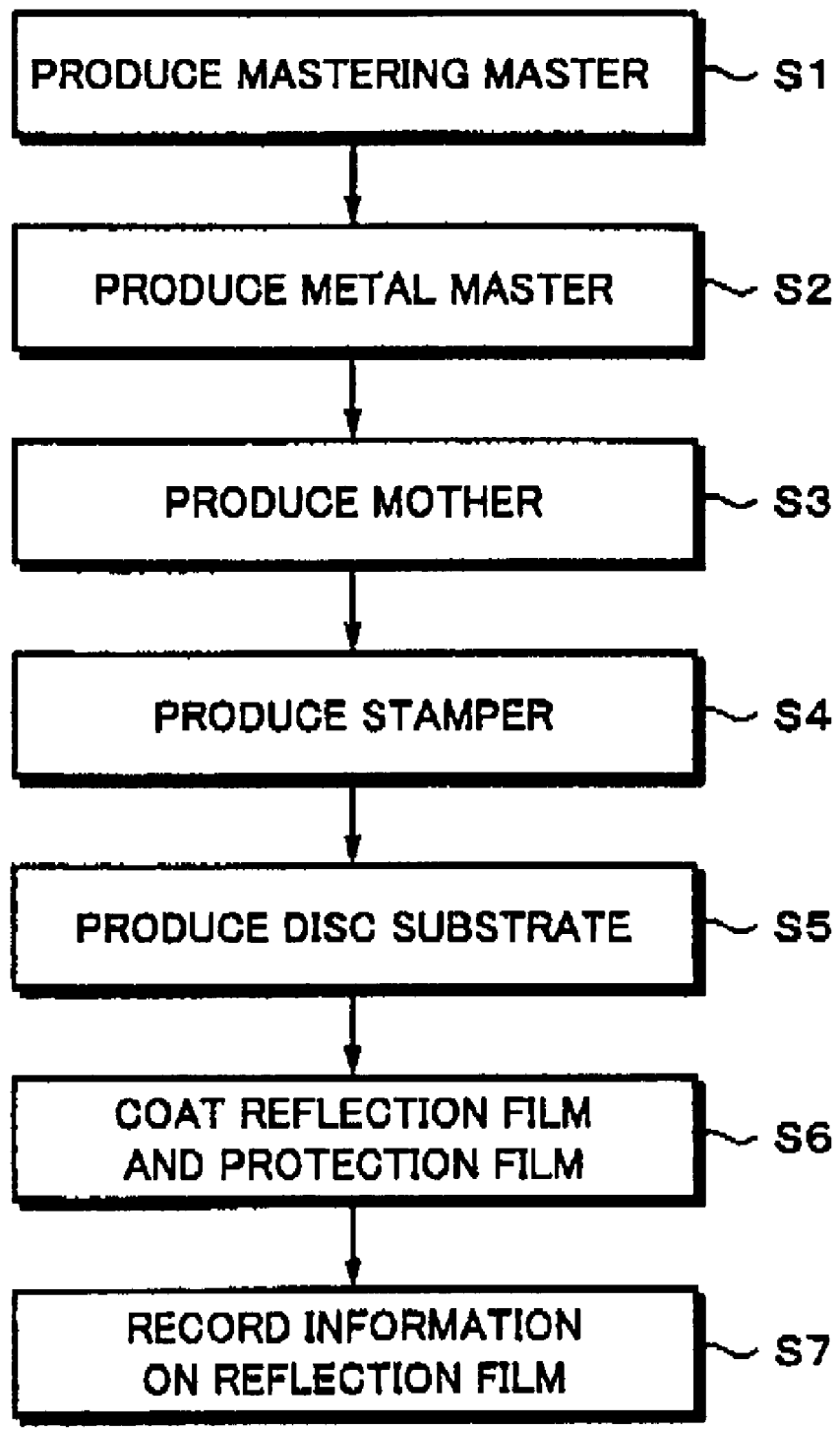
FIG. 3 is a flow chart for describing disc identification information that is recorded.

On the other hand, in the example shown in FIG. 3, the laser beam is radiated on the reflection film (mirror portion for example lands). In addition, information is post-scribed (at step S7). On the lands of the reflection film, the laser beam is radiated. In other words, when a heat process (heat recording) is performed, since atoms are traveled, the film structure and crystal characteristic are varied. As a result, the reflectance of the place decreases. Thus, after the laser beam has been radiated to the lands, the return beam thereof decreases. Thus, the reading apparatus recognizes lands as pits. Using that phenomenon, when the pit length or land length are varied, information can be recorded. In that case, the reflection film is made of a material whose reflectance is varied with a laser radiation is used. When the laser beam is radiated to the reflection film, namely, information is recorded, the reflectance of the reflection film may be not only decreased, but increased depending on the material of the reflection film.

In reality, the reflection film is made of an aluminum alloy film $Al_{100-y}X_y$, where X is at least one selected from the group consisting of Ge, Ti, Ni, Si, Tb, Fe, and Ag and where the composition ratio y in the Al alloy film satisfies the relation of $5<y<50$ [atomic %].

In addition, the reflection film can be made of an Ag alloy film $Ag_{100-z}Y_z$, where Y is at lest one selected from the group consisting of Ge, Ti, Ni, Si, Tb, Fe, and Al and where the composition ratio z in the Al ally film satisfies the relation of $5<z<50$ [atomic %]. The reflection film can be formed by for example the magnetron spattering method.

As an example, assuming that the reflection film of an AlGe alloy is formed with a thickness of 50 nm and that a laser beam is radiated from the transparent substrate or the protection film side through an objective lens, that the composition rate of Ge is 20 [atomic %], and that the record power is in the range from 6 to 7 [mW], the reflectance decreases by around 6%. In those conditions, assuming that the composition ratio of Ge is 27.6 [atomic %] and that the record power is in the range from 5 to 8 [mW], the reflectance decreases by around 7 to 8%. Since the reflectance varies in such a manner, information can be post-scribed on the reflection film.

Figure 4:
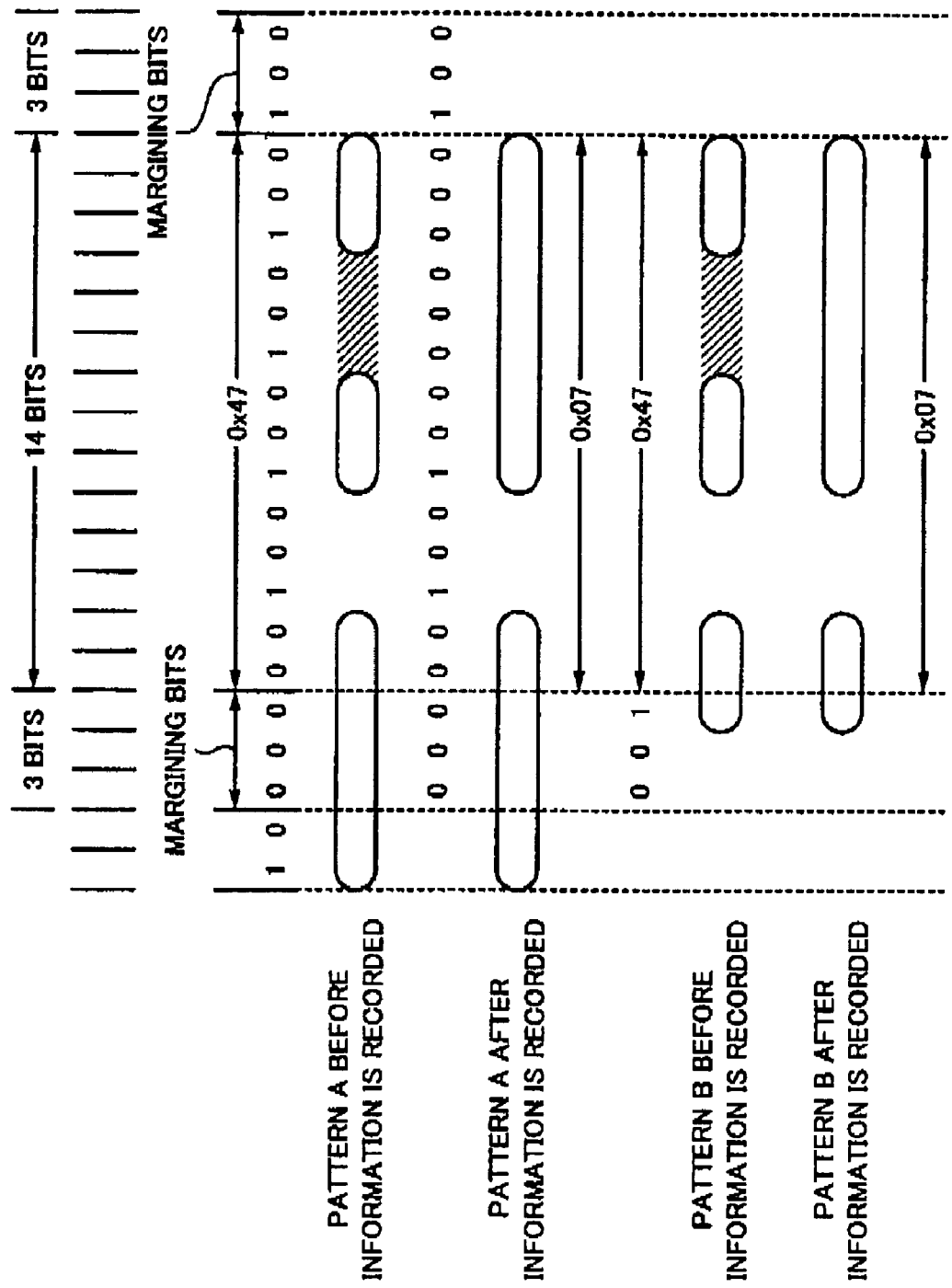
FIG. 4 is a schematic diagram for describing identification information that is recorded.

FIG. 4 is a schematic diagram for practically describing the method for post-scribing the unique disc identification information (UDI). There are two patterns A and B corresponding to the relation between record data and pits/lands.

First of all, the pattern A will be described. Three margining bits (000) are placed between two symbols. When information is post-scribed, an eight-bit data symbol is for example (0x47), where 0x represents hexadecimal notation. FIG. 4 shows a 14-bit pattern of which the eight bits have been modulated by the EFM (Eight to Fourteen Modulation) method.

A laser beam Is radiated to a hatched area between two pits so as to post-scribe information thereto. As a result, the reflectance of the hatched area decreases. After information has been recorded, the two pits are treated as one connected pit. In that case, the 14-bit pattern becomes (00100100000000). When the 14-bit pattern is EFM-demodulated, eight bits of (0x07) are obtained.

In the case of the pattern B, the margining bits are (001). In the case, like the pattern A, when a laser beam is radiated to a hatched area, eight bits can be changed from (0x47) to (0x07).

As was described above, a data symbol (0x47) can be rewritten to (0x07). Beside that example, there are many types of data that can be post-scribed. For example, a data symbol (0x40) can be changed to (0x00). However, when information is post-scribed, a laser beam is radiated to a mirror portion on which data has been recorded. As a result, the length of a pit or a land is varied. Thus, the types of data that can be post-scribed are restricted.

Returning to FIG. 1, an example of a system according to the present invention will be described. The system uses the disc 25 on which such unique disc identification information (UDI) can be post-scribed.

In FIG. 1, when an album CD disc or a single CD disc is produced, the music company 11 requests the disc plant 21 to produce the disc. A music source 12 created by an artist Is sent from the music company 11 to the disc plant 21. The music source 12 is normally provided as a tape or a disc on which music data has been digitally or analogously recorded by the artist. The tape or disc is delivered from the music company 11 to the disc plant 21. The format of the music source 12 and the method for sending the music source 12 from the music company 11 to the disc plant 21 are not limited. When the music company 11 requests the disc plant 21 to produce the disc, the music company 11 asks the disc plant 21 to post-scribe unique disc identification information (UDI) on the disc.

In addition, the music source 12 is sent to a music piece server 13 of the music company 11 (or software house). The music piece server 13 is a server of a library of music pieces of CDs that the music company 11 has released so far. The music piece server 13 stores music data of many music pieces whose copyright the music company 11 has and music pieces that the music company 11 has released so far. When the music source 12 is sent to the music piece server 13, each piece of music data of the music source 12 is stored to the music piece server 13. Music data of each music piece recorded on the disc 25 that will be released is added to the library. Various types of information 15 about the CD for example the song name and the artist name of each music piece contained as the music source 12 are sent to an ID management server 14 of the music company 11 (or the software house).

When the disc plant 21 has been requested to produce a CD disc by the music company 11 and has received the music source 12, the disc plant 21 produces the CD disc on which the music data of the music source 12 is recorded. At that point, since the music company 11 has been requested by the disc plant 21 to post-scribe the unique disc identification information (UDI), the disc plant 21 records the unique disc identification information (UDI) on the disc.

In other words, when the disc plant 21 has been requested by the music company 11 to produce the CD disc and has received the music source 12 from the music company 11, the disc plant 21 starts a disc production process 22. In the disc production process 22, the disc plant 21 produces a master disc on which music data of the music source 12 is recorded. The disc plant 21 produces a CD disc on which the music data of the music source 12 is recorded with the master disc through a stamper.

The disc production process 22 is followed by an ID write process 23. In the ID write process 23, the unique disc identification information (UDI) is post-scribed on each disc. The unique disc identification information (UDI) that is post-scribed on each disc is managed by an ID write control server 24. The unique disc identification information (UDI) that has been recorded on each disc that has been produced that time is sent to the ID management server 14 of the music company 11 or the software house.

The disc production process 22 and the ID write process 23 are shown in FIG. 3 and FIG. 4.

The disc 25 that has been produced through the disc production process 22 and the ID write process 23 is contained in a case and then wrapped as a final product through a wrapping process 26. The disc 25 as the final product is delivered to the end user 31. While the disc 25 is delivered to the end user 31, there are several sales channels for example a channel from a music publisher to a CD retailer through a whole seller, a channel from a music publisher to a CD retailer, and a channel from a music publisher to the end user 31 as a direct sales channel. When a regular end user 31 buys a disc 25, he or she will go to a CD retailer and buy the disc 25 with payment.

After the end user 31 has bought the disc 25, he or she perform a registration operation for the disc. Unless the end user 31 has performed the member registration, he or she connects his or her personal computer 32 that has a network connecting function to for example the Internet to the ID management server 14 of the music company 11 so as to perform the member registration. Since the personal computer 32 has a CD drive, the personal computer 32 can reproduce music data and unique disc identification information (UDI) from the disc 25. Of course, a conventional CD player can reproduce music data from the disc 25.

Figure 5:
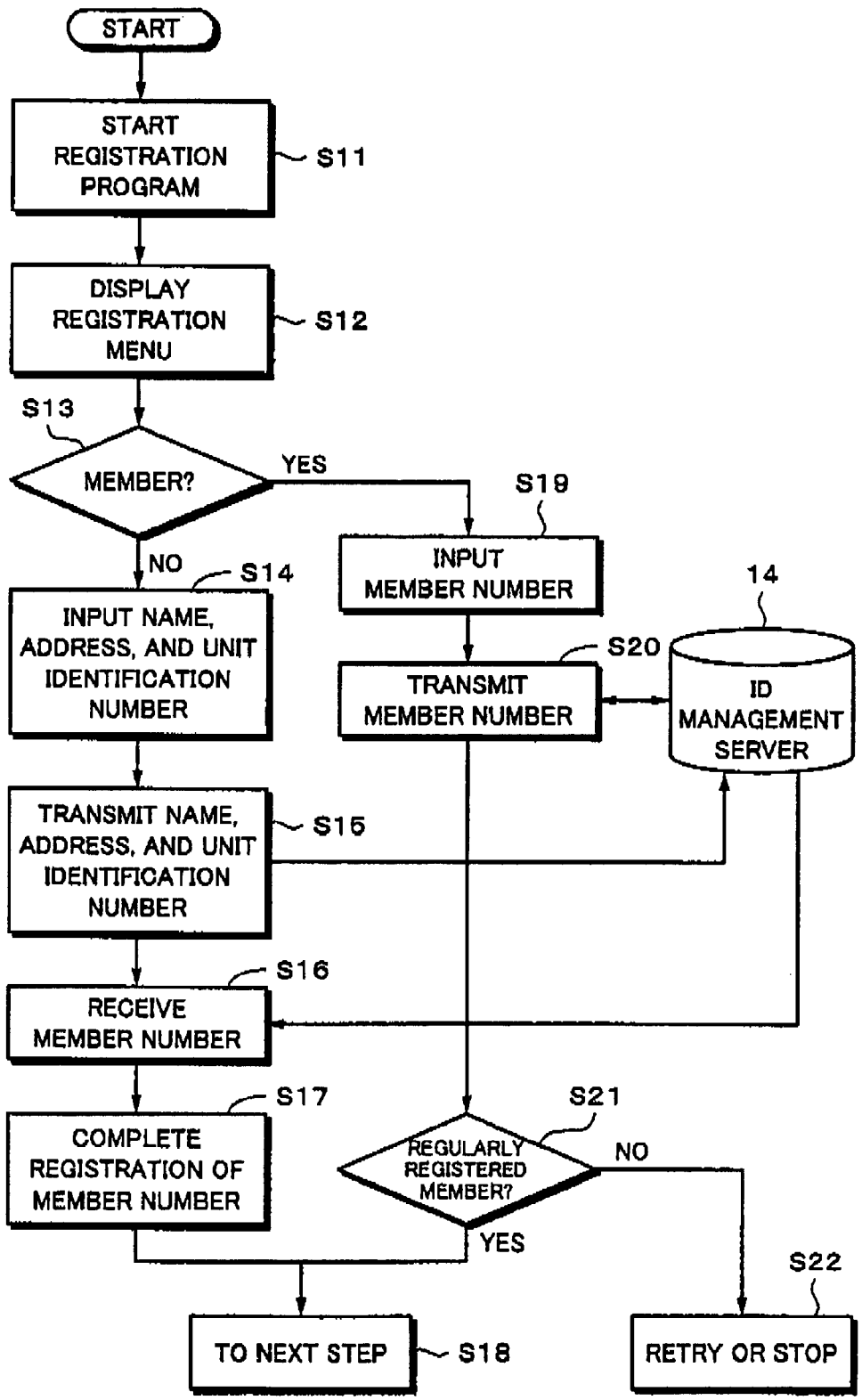
FIG. 5 is a flow chart for describing a member registration process.

FIG. 5 shows a member registration process. In FIG. 5, when the disc 25 that the end user 31 has bought is loaded to the personal computer 32 of the end user 31, a member registration program is started (at step S11). When the member registration program is started, a member registration menu is displayed (at step S12). At step S12, it is determined whether or not the end user 31 has registered as a member (at step S13).

When the end user 31 has not been registered as a member, he or she inputs his or her personal information such as his or her name and address and unit identification information. As the personal information, the end user 31 may be requested to input user's birthday, sex, occupation, e-mail address, and store name he or she has bought the CD. Such information can be used as customer information to advertise now products and research the buying power of the customers. The unit identification information is unique identification information of the portable digital audio reproducing unit that receives the music distribution service. When the cellular phone terminal unit is used as a portable digital audio reproducing unit, the telephone number of the cellular phone can be used as unit identification information.

When the personal information is input, such as end user's name, address, unit identification information are sent from the personal computer 32 of the end user 31 to the ID management server 14 of the music company 11 (at step S15). The personal computer 32 of the end user 31 and the ID management server 14 of the music company 11 are connected through for example the Internet. The member registration process is performed through an network such as the Internet.

After the ID management server 14 of the music company 11 has received the personal information from the end user 31, the ID management server 14 determines whether or not the personal information has been fully described and whether or not the personal information has been dually registered. When the personal information that has been received from the personal computer 32 is proper, the ID management server 14 stores the personal information and issues a member number to the end user 31. When the member number has been received by the personal computer 32 of the end user 31 (at step S16), the member registration process is completed (at step S17). Thereafter, the flow advances to the next step (at step S18).

When the end user 31 who has registered as a member starts the member registration program, the flow advances to step S13. At step S13, it is determined that he or she has registered as a member. In that case, the end user 31 inputs his or her member number (at step S19).

When the member number has been input, the member number is sent from the personal computer 32 of the end user 31 to the ID management server 14 of the music company 11 (at step S20).

When the ID management server 14 of the music company 11 has received the member number, the ID management server 14 references the information of the end user whose has the member number and determines whether or not the end user has been regularly registered as a member. The ID management server 14 of the music company 11 sends the determined result to the personal computer 32 of the end user 31.

Corresponding to the information sent back from the ID management server 14 of the music company 11 to the personal computer 32 of the end user 31, it is determined whether or not the end user 31 has been regularly registered as a member (at step S21). When the end user 31 has been regularly registered as a member, the flow advances to the next step (at step S18). When the determined result represent that the end user 31 has not been regularly registered as a member, the process is repeated or terminated (at step S22).

In FIG. 1, when the end user 31 buys the disc 25, if he or she has registered as a member, the registration process is performed at once through a network such as the Internet. At that point, if the end user 31 has not been registered as a member, after he or she registers as a member, he or she performs the registration process. In the registration process, unique disc identification information (UDI) is read from the disc 25. The unique disc identification information (UDI) of the disc 25 is sent from the personal computer 32 of the end user 31 to the ID management server 14 of the music company 11. Corresponding to the unique disc identification information (UDI) received from the ID write control server 24, various types of information 15 about the CD that is created such as song names and artist names of music pieces of the music source 12, and the personal information received from the personal computer 32 of the end user 31 when he or she has registered as a member, a customer and owning music piece list is created in the ID management server 14 of the music company 11.

Figure 6:
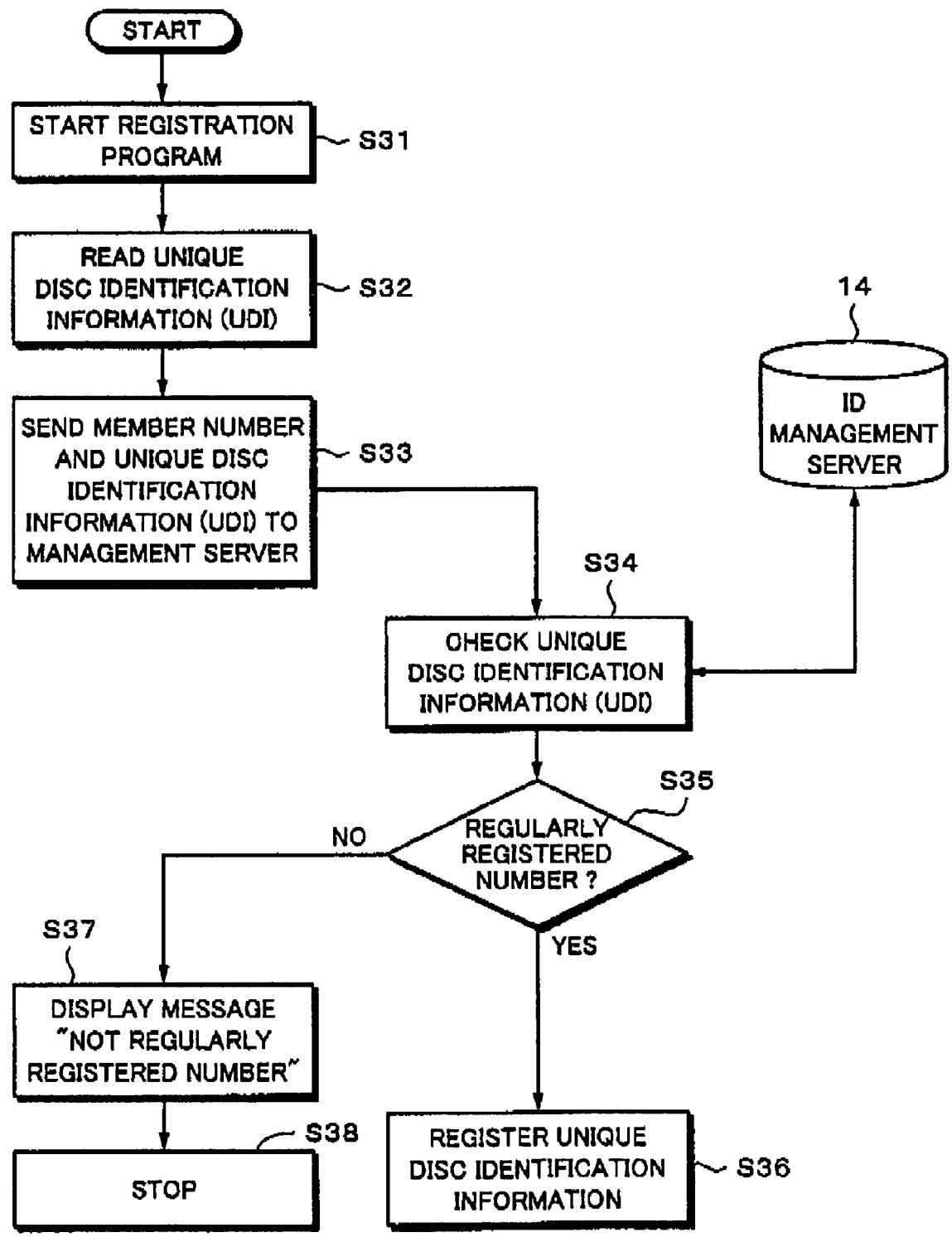
FIG. 6 is a flow chart for describing a registration process performed when a disc is bought.

FIG. 6 is a flow chart showing the registration process for the disc 25 that the end user 31 has bought.

In FIG. 6, when the registration program is started (at step S31), unique disc identification information (UDI) is read from the disc 25 (at step S32). After the unique disc identification information (UDI) has been read, the unique disc identification information (UDI) and the member number are sent from the personal computer 32 of the end user 31 to the ID management server 14 of the music company 11 (at step S33).

The ID management server 14 of the music company 11 compares the unique disc identification information (UDI) received from the personal computer 32 of the end user 31 with identification information created corresponding to the identification information list received from the ID write control server 24 and checks the unique disc identification information (UDI) (at step S34). At that point, it is determined whether or not the unique disc identification information (UDI) has been falsified and whether or not it has been dually registered. Corresponding to the checked result of the unique disc identification information (UDI), it is determined whether or not the unique disc identification Information (UDI) is a regularly registered number (at step S35).

When the determined result represents that the unique disc identification information (UDI) received from the personal computer 32 of the end user 31 is a regularly registered number, the relevant information is registered to the ID management server 14 of the music company 11 (at step S36).

When the determined result represents that the unique disc identification information (UDI) is not a regularly registered number, the relevant information Is sent from the ID management server 14 of the music company 11 to the personal computer 32 of the end user 31. A message "not regularly registered user" is disposed on the display of the personal computer 32 of the end user 31 (at step S37). Thereafter, the process is terminated (at step S38).

When the end user 31 buys the disc 25, the registration process is performed in such a manner. In the registration process, the unique disc identification information (UDI) is read from the disc 25. As shown in FIG. 7, a customer and owning music piece list is created.

As shown in FIG. 7, the customer and owning music piece list describes the name of users who have bought CDs, member numbers, CD identification information, single/album information, artist names, titles, song names, and unit identification information. With the customer and owning music piece list, music pieces that each user owns are obtained.

The name of user who has bought the CD, member number, and unit identification information such as cellular phone number are described when the personal computer 32 is connected to the ID management server 14 and the end user 31 is registered as a member to the ID management server 14. The CD identification information is described corresponding to the unique disc identification information (UDI) that is read from the disc 25 when the end user 31 loads the disc 25 to the personal computer 32 and connects the personal computer 32 to the ID management server 14. The single/album information, artist name, title, and music piece name are described corresponding to various types of information 15 about the CD that is produced.

In FIG. 1, the music company 11 has a music distribution server 16. The music distribution server 16 performs a music distribution service through the Internet and a cellular phone line. The music distribution server 16 provides music data of music pieces stored in the music piece server 13. The music distribution server 16 references the customer and owning music piece list (see FIG. 7) stored in the ID management server 14 and provides a user who has bought a CD with the music distribution service with priority.

For example, as shown in FIG. 7, it is assumed that an end user 31 whose member number is "9012" and who is "ICHIRO SUZUKI" has bought a CD disc 25 whose unique disc identification information is "1234567". When the end user 31, who is "ICHIRO SUZUKI", loads the disc 25 to the personal computer 32 and connects the personal computer 32 to the ID management server 14 of the music company 11, the unique disc identification information (UDI) is read from the disc 25. The unique disc identification information (UDI) is sent from the personal computer 32 of the end user 31 to the ID management server 14. The unique disc Identification information (UDI) "1234567" is described as CD identification information, the single/album information, artist name "ICHIRO SATO", title "SPRING AND SUMMER", music piece name "FIRST WIND IN SPRING" are described corresponding to various types of information 15 about the CD that is produced. When the member registration is performed, as the unit identification information, the cellular phone number "0904578954" is described.

Thus, when the end user 31 who is "ICHIRO SUZUKI" has registered as a member and the unique disc identification information (UDI) of the disc 25 that he had bought has been sent to the ID management server 14 of the music company 11, the unique disc identification information (UDI) is registered to the customer and is owning music piece list. At a result, the end user 31 who is "ICHIRO SUZUKI" can be provide with the music distribution service for the music piece that he or she owns with priority. In that case, when the end user 31 whose is "ICHIRO SUZUKI" accesses the music distribution server 16 with the cellular phone with the telephone number "0904578954", the end user 31 is permitted to reproduce the music pieces "FIRST WIND IN SPRING" and "FIRST WIND IN SUMMER" of the disc title "SPRING AND SUMMER". Alternatively, when the music distribution service is performed for music data that is downloaded or reproduced as streaming data, the user is provided with it free of charge or at low price.

Figure 8:
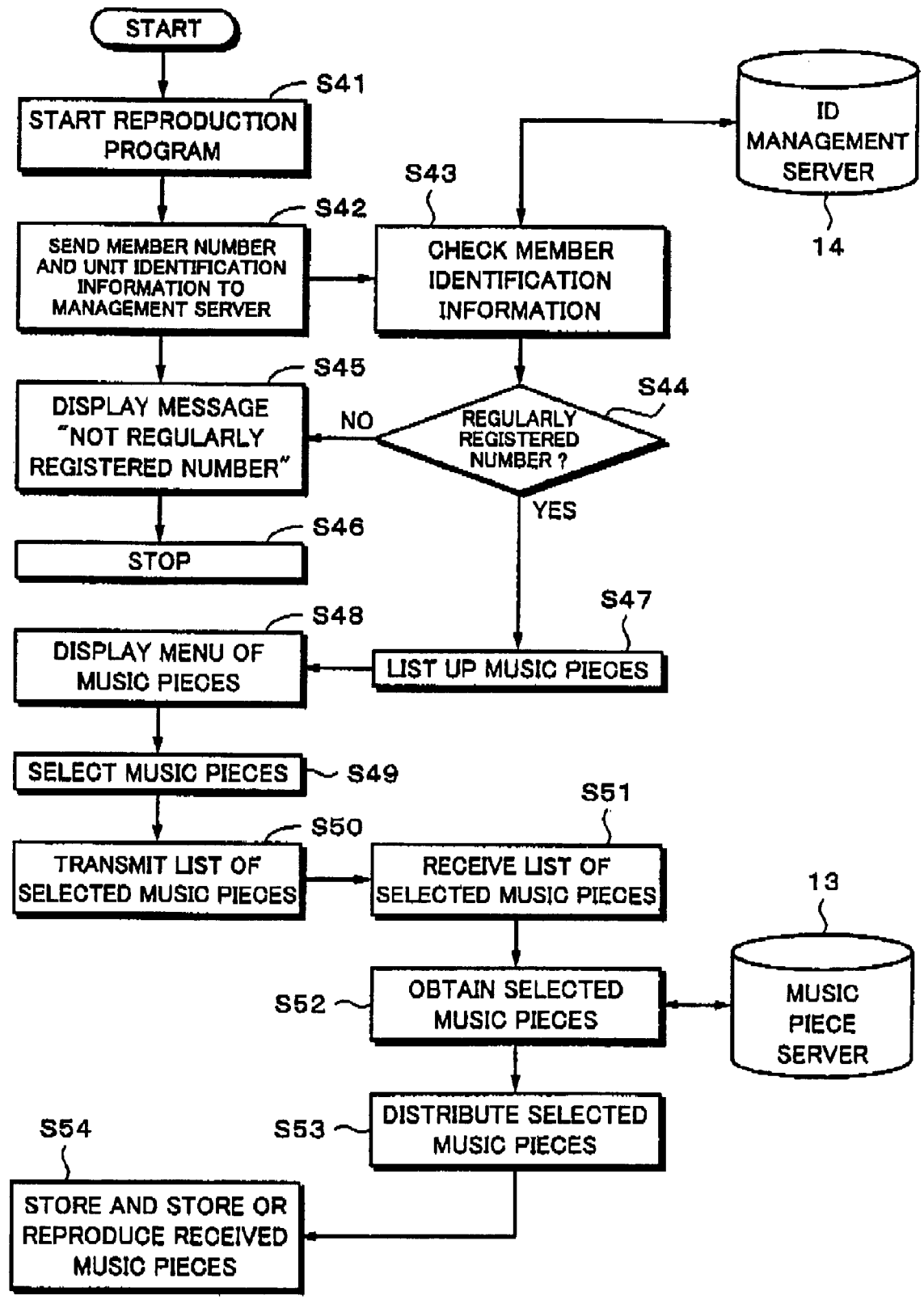
FIG. 8 is a flow chart for describing a distribution process.

FIG. 8 is a flow chart showing a process for receiving a music distribution service using a portable digital audio reproducing unit 33. In FIG. 8, a music reproduction program is started (at step S41). With the portable digital audio reproducing unit 33, a member number and unit identification information are sent to the music distribution server 16 of the music company 11 (at step S42). The member number and the unit identification information can be automatically sent using a memory function. When a cellular phone is used as a portable digital audio reproducing unit, the unit identification information can be obtained with the sender telephone number.

When the music distribution server 16 has received information of the member number and the unit identification information from the portable digital audio reproducing unit 33 of the end user 31, the music distribution server 16 asks the ID management server 14 for the member number and the unit identification information (at step S43). Corresponding to the obtained information, the music distribution server 16 determines whether or not the member number and the unit identification information have been regularly registered as a member number and unit identification information (at step S44). When the determined result represents that the member number and the unit identification information have not been regularly registered, the relevant information is sent back from the music distribution server 16 to the portable digital audio reproducing unit 33 of the end user 31. A message "not regularly registered number" is displayed on the display of the portable digital audio reproducing unit 33 (at step S45). Thereafter, the process is terminated (at step S46).

When the determined result represents that the received member number and unit identification information have been regularly registered, with reference to information stored in the ID management server 14, a list of music pieces that the user owns is created. In other words, with reference to the customer and owning music piece list shown in FIG. 7, a list of music pieces of the CD that the user has bought and registered is created (at step S47). The list of the music pieces that the user owns in sent from the music distribution server 16 to the portable digital audio reproducing unit 33 of the end user 31. The portable digital audio reproducing unit 33 displays the list of music pieces that the user owns (at step S48).

The end user 31 selects music pieces that he or she wants to be distributed from the menu list (at step S49). The list of the selected music pieces is sent from the portable digital audio reproducing unit 33 to the music distribution server 16 (at step S50).

When the music distribution server 16 has received the list of the selected music pieces from the portable digital audio reproducing unit 33 of the end user 31 (at step S51), the music distribution server 16 accesses the music piece server 13 and obtains music data of the selected music pieces therefrom (at step S52). The music data of the selected music pieces is distributed from the music piece server 13 to the portable digital audio reproducing unit 33 of the end user 31 through the music distribution server 16 (at step S53).

When the portable digital audio reproducing unit 33 of the end user 31 has received the music data from the music distribution server 16, the portable digital audio reproducing unit 33 reproduces the music data or stores it to a memory (at step S54). In other words, when music data is distributed as steaming data, while it is being received, it is reproduced. When music data is downloaded, it is stored in the memory. The streaming is one distribution method of which while music data is being received, it is reproduced. The downloading is another distribution method of which music data is compressed according to MP3 or ATRAC3 and transmitted as a file.

Figure 9:
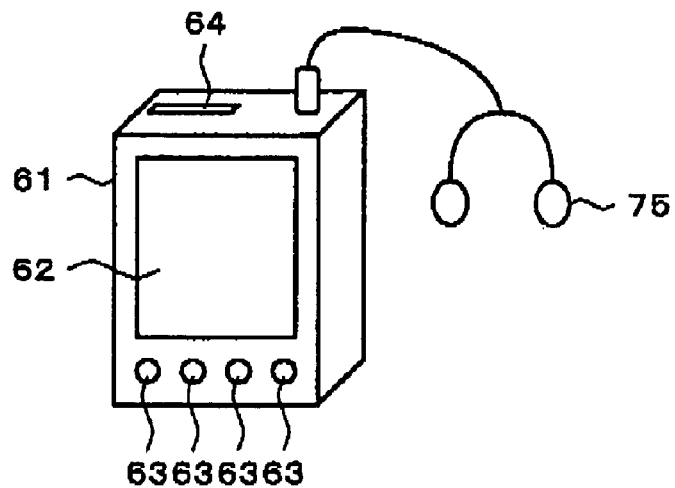
FIG. 9 is a plan view showing an example of a PDA used as a portable digital audio apparatus.

FIG. 9 shows an example of the portable digital audio reproducing unit according to the present invention. In the example, a PDA is used as the portable digital audio reproducing unit.

As shown in FIG. 9, at the front of a unit 61, a liquid crystal panel 62 having a touch panel is disposed. By tapping an icon displayed on the liquid crystal panel 62 with a stylus pen (not shown), the user can input various types of data. By tracing letters on the liquid crystal panel 62 with the stylus pen, the user can input manuscript letters.

Below the liquid crystal panel 62, buttons 63, 63, 63, . . . are disposed. The buttons 63, 63, 63, . . . are a power switch, icon buttons, and up and down scroll buttons. The icon buttons are linked with application software. When an icon button is pressed, a designated application is started.

An extension slot 64 is disposed at a top portion of the unit 61. In the extension slot 64, an extension module can be attached. There are extension modules that are an extension memory, a camera extension module, a GPS extension module, and so forth. The unit 61 has an infrared ray interface 66 and a USB interface 67.

Figure 10:
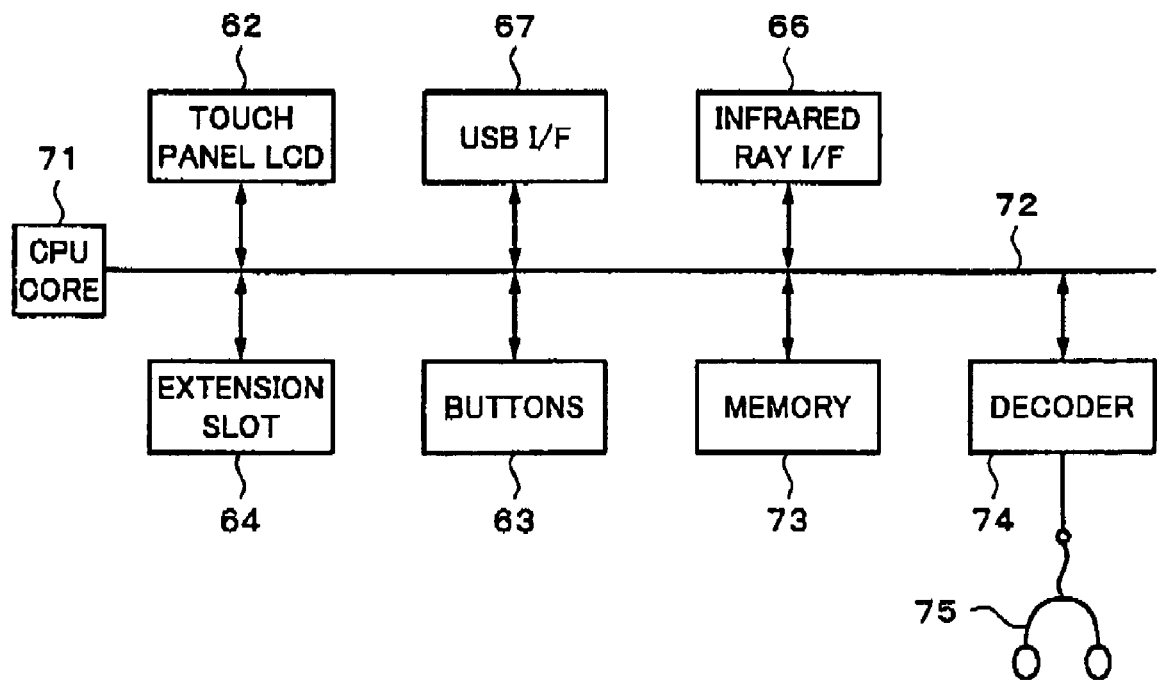
FIG. 10 is a block diagram showing a structure of an example of a PDA used as a portable digital audio apparatus.

FIG. 10 shows an internal structure of the unit 61. In FIG. 10, a CPU core 71 is a processor in which a memory management portion, an I/O controller, and so forth are integrated. A bus 72 extends from the CPU core 71. The liquid crystal panel 62 with the touch panel, the USB interface 67, the infrared ray interface 66, the extension slot 64, the buttons 63, and a non-volatile memory 73 are connected to the bus 72. An MP3 or ATRAC3 decoder 74 is connected to the bus 72. The decoder 74 can decode data that has been encoded according to MP3 or ATRAC3. The decoded data is converted into an analog signal and output from a head set 75.

The USB interface 67 is mainly used to exchange data with a personal computer. When the unit 61 is placed on a cradle (not shown) and then a button (not shown) on the cradle is pressed, the unit 61 starts communicating with the personal computer and exchanges data therebetween.

A communication module can be connected to the USB interface 67. When the communication module is connected to the USB interface 67, the apparatus 61 can be accessed to the Internet. The infrared ray interface 66 is used to exchange data between those units and between the unit and a cellular phone terminal unit.

The unit 61 can access the Internet with the USB Interface 67 and make a connection to the music distribution server 16. When the unit 61 is initially set, unique unit identification information as a user ID is recorded to the non-volatile memory 73. In addition, application software for accessing the Internet and application software for decoding encoded music data according to MP3 or ATRAC3 data have been installed in the unit 61.

When the unit 61 as the portable digital audio reproducing unit 33 is connected to the music distribution server 16 through the Internet, the user ID and the member number of the unit 61 are sent to the music distribution server 16. When the music distribution server 16 has determined that the member number and the unit identification information are those that have been regularly registered, a list of music pieces that the user owns is displayed on the liquid crystal panel 62. When the user selects a music piece that he or she wants to obtain from the list, music data of the selected music piece is sent from the music distribution server 16 to the unit 61. The received music data is stored in the memory 73 (or an external memory). The decoder 74 starts the application software for decoding encoded music data according to MP3 or ATRAC3 and decodes the music data stored in the memory 73 on the application software. The decoded data is converted into an analog signal and output from the head set 75.

As was described above, in that example, with a CD disc 25 on which unique disc identification information (UDI) has been post-scribed, the user thereof can be identified. Music pieces that each user owns are managed. A user who owns a music piece can be provided with a music distribution service for the music piece with priority.

In the forgoing example, it is preferred that the server side should distinguish unique disc identification information (UDI) for rental CDs that rental stores rent from unique disc identification Information (UDI) for other CDs. In that case, since rental CDs can be properly managed, copyright thereof can be protected.

In the forgoing example, a CD disc is used as a recording medium. However, the present invention can be applied to other recoding mediums. For example, unique disc identification information (UDI) can be post scribed in some card type recording mediums using flash memories. However, as long as the unique disc identification information (UDI) can be read by a personal computer, the forgoing system can be structured.

In the forgoing example, music data is reproduced. However, the same system can be applied to a DVD (Digital Versatile Disc) for video data such as movies. In addition, content data may be music data, video data of movies, and programs for reproducing video games.

The content provider side can provide a customer who has bought a recording medium on which a content had been regularly recorded with various levels of services. For example, it is assumed that a content provider permits a user who has bought a recording medium to transfer the ownership thereof to another person. At that point, when the user accesses the registration site and deletes his content from the list, he or she can transfer the ownership thereof to another person. The transferee can perform the user registration process in the same manner as above.

FIG. 11 shows another example of the present invention. In the forgoing example of the system, unique disc identification information (UDI) can be post-scribed to each disc. However, in this example, a conventional CD disc is used.

In FIG. 11, when an album or single CD disc is produced, a music company 111 requests a disc factory 121 to produce the CD disc. A music source 112 created by an artist is sent from the music company 111 to the disc factory 121. The music source 112 is provided as an analogously or digitally recorded tape or disc by the artist. The tape or disc is sent from the music company 111 to the disc factory 121.

The music source 112 is sent to a music piece server 113. The music piece server 113 is a server as a library of music pieces of CDs that the music company 111 has released so far. When the music source 112 is sent to the music piece server 113, music data of each piece of the music source 112 is stored in the music piece server 113. Music data of music pieces of a CD that the music company 111 will release this time is added to the library. In addition, various types of information about the CD such as the song name and artist name of each music piece contained in the music source 112 are sent to an ID management server 114 of the music source 112.

When the disc factory 121 has been requested by the music company 111 to produce a CD disc for the music source 112 and has received the music source 112, the disc factory 121 produces a CD disc on which music data of the music source 112 is recorded. In other words, when the disc factory 121 has been requested by the music company 111 to produce a CD disc 125 and received the music source 112, a disc production process 122 is started. In the disc production process 122, a master disc on which the music data of the music source 112 has been recorded is produced. With the master disc, CD discs 125 on which the music data of the music source 112 has been recorded are quantitatively produced through a stamper.

The discs produced in such a manner are contained in CD cases and wrapped as final produces through a wrapping process 126. In the wrapping process, disc identification information is printed on the front surface of each disc or a song card or another paper wrapped with the disc. The disc identification information is managed by an ID write control server 124. In addition, disc identification information recorded on each disc that has been produced this time is sent to the ID management server 114 of the music company or software house. A disc as a final produce is contained in a CD case, wrapped through the wrapping process 126, and delivered to an end user 131.

When the end user 131 has bought the CD disc 125, he or she performs a registration process for the CD disc 125. Unless the end user 131 has registered as a member, he or she registers as a member before registering the CD disc. When the end user 131 registers as a member, personal information such as the name, address, telephone number, and e-mail address of the user is sent from a personal computer 132 of the and user 131 to the ID management server 114 of the music company 111.

After the end user 131 has bought the CD disc 125, he or she inputs the disc identification information with the personal computer 132 having a network connecting function using for example the Internet so an to perform the disc registration process.

In other words, disc identification information is printed on the front surface of each disc 125 or a song card or another paper wrapped with the disc. When the end user 131 performs the disc registration process, he or she inputs the disc identification information. The disc identification information is sent from the personal computer 132 of the end user 131 to the ID management server 114 of the music company 111 through a network such as the Internet.

The ID management server 114 of the music company 111 creates a customer and owning music piece list corresponding to the identification information received from the ID write control server 124, various types of information 115 about the CD that is produced such as the song name, artist name, and so forth of each music piece contained as the music source 112, the disc personal information received from the personal computer 132 when end user 131 has registered as a member, and the disc identification information.

The customer and owning music piece list contains the user name, member number, CD identification information, single/album information, artist name, title, song name, and unit identification information.

In addition, the music company 111 has a music distribution server 116. The music distribution server 116 performs the music distribution service using a portable digital audio reproducing unit 133 through the Internet or a cellular phone line. The music distribution server 116 can provide music data of music pieces stored in the music piece server 113. The music distribution server 116 references the customer and owning music piece list stored in the ID management server 114 and provides the user who has bought the CD with the music distribution service with priority.

As described above, in that example, with disc identification information printed on each disc or paper wrapped with the disc, music pieces of the CD disc that each use has bought are managed. The other structure of the second example of the system is the same as that of the first example of which unique disc Identification information (UDI) is post-scribed for each disc.

As was described above, according to the present invention, unique disc Identification information (UDI) is post-scribed on each CD disc on which for example music data has been recorded. After the end user has bought a disc, he or she performs a disc registration process and sends an identification number of the disc to a management server of a content provider through a network such as the Internet. With the unique disc identification information, a list representing music pieces that each user owns is created. Corresponding to the list, each user is permitted to reproduce music pieces that he or she owns and download them free of charge or at low price.

Thus, when the and user has bought a CD, he or she is provided with a music distribution service for music data of the CD with priority. Thus, the user can not only reproduce music data from the CD at home, but download the same music data from the content server to his or her portable digital audio reproducing unit using the music distribution service and reproduce the downloaded music data with the unit anytime and anywhere. Thus, when the end user uses the portable digital audio reproducing unit, he or she does not need to copy the music data from the CD disc. In addition, the end user does not need to buy the same music data as the CD disc that he or she has bought.

In addition, the content provider side can expect that opportunities that users who have bought CDs will copy music data of the CDs will decrease. Thus, according to the present invention, copyright of music data can be easily protected. In addition, without necessity to copy music data from a CD disc to a portable digital audio reproducing unit, since the end user can obtain the music data through the music distribution service, it can be predicted that the sales of CDs are not affected (not decreased).

In addition, since sales of CDs are linked with a music distribution service, it can be predicted that contents providers will actively provide their music pieces through the music distribution service. Thus, it can be expected that the music distribution service will grow.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A server that connects to a user terminal, the server comprising:

a memory that stores unique identification information of an optical disc that stores at least one content data;

a receiver that receives user account information and the unique identification information from the user terminal;

a processor configured to perform an authentication of the user terminal for a transfer of the at least one content data based on a reception by the server of the unique identification information and the user account information from the user terminal and to associate the user account information with the unique identification information upon a determination that the unique identification information has not previously been registered by the server based on the reception of the user account information and the unique identification information; and a transmitter that sends an authentication result to authorize the transfer of the at least one content data, in response to the authentication of the user terminal.

2. The server as set forth in claim 1, wherein the authentication result authorizes the transfer of the at least one content data to a portable reproducing unit including a semiconductor memory.

3. The server as set forth in claim 1, wherein the authentication result is sent free of charge by the server.

4. The server as set forth in claim 1, wherein the unique identification information of the optical disc is printed on an enclosure of a package of the optical disc, and the at least one content data includes video data.

5. The server as set forth in claim 1, wherein the user account information indicates an address, a telephone number, and an email address.

6. A server that connects to a user terminal, the server comprising:

a memory that stores unique identification information of an optical disc that stores at least one content data;

a receiver that receives user account information and the unique identification information from the user terminal;

a processor configured to perform an authentication of the user terminal for a transfer of the at least one content data based on a reception by the server of the unique identification information and the user account information from the user terminal and to associate, based on the reception of the user account information and the unique identification information, the user account information with the unique identification information upon a determination that the unique identification information has not been falsified; and a transmitter that sends an authentication result to authorize the transfer of the at least one content data, in response to the authentication of the user terminal.

7. A method implemented by a server that connects to a network, the method comprising:

storing unique identification information of an optical disc that stores at least one content data;

receiving user account information and the unique identification information via a network;

associating the user account information with the unique identification information upon a determination, based on a reception of the user account information and the unique identification information via the network, that the unique identification information has not previously been registered by the server;

performing, with the server, an authentication for a transfer of the at least one content data based on the reception of the user account information and the unique identification information via the network; and sending via the network an authentication result to authorize the transfer of the at least one content data, in response to the authentication.

8. The method as set forth in claim 7, wherein the authentication result authorizes the transfer of the at least one content data to a portable reproducing unit including a semiconductor memory.

9. The method as set forth in claim 7, wherein the authentication result is sent via the network free of charge by the server.

10. The method as set forth in claim 7, wherein the unique identification information of the optical disc is printed on an enclosure of a package of the optical disc, and the at least one content data includes video data.

11. A computer-readable non-transitory storage medium encoded with computer executable instructions, wherein the instructions, when executed by a processing unit, cause the processing unit to perform a method comprising:

storing unique identification information of an optical disc that stores at least one content data;

receiving user account information and the unique identification information via a network;

associating the user account information with the unique identification information upon a determination, based on a reception of the user account information and the unique identification information via the network, that the unique identification information has not previously been registered by the processing unit;

performing an authentication for a transfer of the at least one content data based on the reception of the user account information and the unique identification information via the network; and sending via the network an authentication result to authorize the transfer of the at least one content data, in response to the authentication.

12. The computer-readable non-transitory storage medium as set forth in claim 11, wherein the authentication result authorizes the transfer of the at least one content data to a portable reproducing unit including a semiconductor memory.

13. The computer-readable non-transitory storage medium as set forth in claim 11, wherein the authentication result is sent via the network free of charge.

14. The computer-readable non-transitory storage medium as set forth in claim 11, wherein the unique identification information of the optical disc is printed on an enclosure of a package of the optical disc, and the at least one content data includes video data.

15. A user terminal, comprising:

an optical disc drive that reads from an optical disc content data, the optical disc associated with unique identification information;

a network interface configured to transmit a transmission of user account information and the unique identification information over a network, and to receive over the network an authentication result for the user terminal to retrieve the content data from the optical disc based on a determination, based on the transmission of the unique identification information and the user account information, that the unique identification information has not previously been registered; and an interface that provides a local connection to a portable reproducing unit that communicates with the user terminal through the interface, the authentication result authorizing a transfer of the content data to the portable reproducing unit.

16. The user terminal as set forth in claim 15, wherein the portable reproducing unit includes a semiconductor memory.

17. The user terminal as set forth in claim 15, wherein the unique identification information of the optical disc is printed on an enclosure of a package of the optical disc, and the content data is video data.

18. The user terminal as set forth in claim 15, wherein the portable reproducing unit connects to the network through a USB cable.

19. A user terminal, comprising:
an optical disc drive that reads from an optical disc content data, the optical disc associated with unique identification information;
a network interface configured to transmit a transmission of user account information and the unique identification information over a network, and to receive over the network an authentication result for the user terminal to retrieve the content data from the optical disc based on a determination, based on the transmission of the unique identification information and the user account information, that the unique identification information has not been falsified; and
an interface that provides a local connection to a portable reproducing unit that communicates with the user terminal through the interface, the authentication result authorizing a transfer of the content data to the portable reproducing unit.

20. A method implemented by a user terminal, the method comprising:
reading from an optical disc content data, the optical disc associated with unique identification information;
transmitting a transmission of user account information and the unique identification information over a network;
receiving, by the user terminal, an authentication result for the user terminal to retrieve the content data from the optical disc based on a determination, based on the transmission of the unique identification information and the user account information, that the unique identification information has not previously been registered; and
communicating with a portable reproducing unit through an interface that provides a local connection to the portable reproducing unit, the authentication result authorizing a transfer of the content data to the portable reproducing unit.

21. The method as set forth in claim 20, wherein the unique identification information of the optical disc is printed on an enclosure of a package of the optical disc, and the content data is video data.

22. A method implemented by a user terminal, the method comprising:
reading from an optical disc content data, the optical disc associated with unique identification information;
transmitting a transmission of user account information and the unique identification information over a network;
receiving, by the user terminal, an authentication result for the user terminal to retrieve the content data from the optical disc based on a determination, based on the transmission of the unique identification information and the user account information, that the unique identification information has not been falsified; and
communicating with a portable reproducing unit through an interface that provides a local connection to the portable reproducing unit, the authentication result authorizing a transfer of the content data to the portable reproducing unit.

23. A computer-readable non-transitory storage medium encoded with computer executable instructions, wherein the instructions, when executed by a processing unit, cause the processing unit to perform a method comprising:
reading from an optical disc content data, the optical disc associated with unique identification information;
transmitting a transmission of user account information and the unique identification information over a network;
receiving an authentication result to retrieve the content data from the optical disc based on a determination, based on the transmission of the unique identification information and the user account information, that the unique identification information has not previously been registered; and
communicating with a portable reproducing unit through an interface that provides a local connection to the portable reproducing unit, the authentication result authorizing a transfer of the content data to the portable reproducing unit.

24. The computer-readable non-transitory storage medium as set forth in claim 23, wherein the unique identification information of the optical disc is printed on an enclosure of a package of the optical disc, and the content data is video data.

25. A computer-readable non-transitory storage medium encoded with computer executable instructions, wherein the instructions, when executed by a processing unit, cause the processing unit to perform a method comprising:
reading from an optical disc content data, the optical disc associated with unique identification information;
transmitting a transmission of user account information and the unique identification information over a network;
receiving an authentication result to retrieve the content data from the optical disc based on a determination, based on the transmission of the unique identification information and the user account information, that the unique identification information has not been falsified; and
communicating with a portable reproducing unit through an interface that provides a local connection to the portable reproducing unit, the authentication result authorizing a transfer of the content data to the portable reproducing unit.

26. A system, comprising:
a server; and
a user terminal that connects with the server,
the user terminal including
an optical disc drive that reads from an optical disc content data, the optical disc associated with unique identification information;
a network interface configured to transmit a transmission of user account information and the unique identification information to the server, and to receive from the server an authentication result for the user terminal to retrieve the content data from the optical disc; and
an interface that provides a local connection to a portable reproducing unit that communicates with the user terminal through the interface, the authentication result authorizing a transfer of the content data to the portable reproducing unit,
the server including
a memory that stores the unique identification information of the optical disc;

a receiver that receives the transmission of the user account information and the unique identification information from the user terminal;

a processor configured to associate the user account information with the unique identification information upon a determination, based on a reception of the transmission by the server, that the unique identification information has not previously been registered by the server, and to perform an authentication of the user terminal for the transfer of the content data based on the reception by the server of the unique identification information and the user account information from the user terminal; and a transmitter that sends the authentication result to the user terminal to authorize the transfer of the content data, in response to the authentication of the user terminal.

27. A system, comprising:

a server; and a user terminal that connects with the server, the user terminal including an optical disc drive that reads from an optical disc content data, the optical disc associated with unique identification information;

a network interface configured to transmit a transmission of user account information and the unique identification information to the server, and to receive from the server an authentication result for the user terminal to retrieve the content data from the optical disc; and an interface that provides a local connection to a portable reproducing unit that communicates with the user terminal through the interface, the authentication result authorizing a transfer of the content data to the portable reproducing unit, the server including a memory that stores the unique identification information of the optical disc;

a receiver that receives the transmission of the user account information and the unique identification information from the user terminal;

a processor configured to associate the user account information with the unique identification information upon a determination, based on a reception of the transmission by the server, that the unique identification information has not been falsified, and to perform an authentication of the user terminal for the transfer of the content data based on the reception by the server of the unique identification information and the user account information from the user terminal; and a transmitter that sends the authentication result to the user terminal to authorize the transfer of the content data, in response to the authentication of the user terminal.

* * * * *